United States Patent [19]

Järås et al.

[11] Patent Number: 5,186,917
[45] Date of Patent: Feb. 16, 1993

[54] PROCESS FOR THE REMOVAL OF $NO_x$ $SO_x$ UTILIZING A PARTICULATE AGENT

[75] Inventors: Sven G. Järås; Marak T. Tokarz, both of Kungälv; Börje Persson, Angered, all of Sweden

[73] Assignee: Eka Nobel AB, Sweden

[21] Appl. No.: 652,411

[22] Filed: Feb. 7, 1991

[30] Foreign Application Priority Data

Feb. 7, 1990 [SE] Sweden .................. 9000444

[51] Int. Cl.⁵ .................. B01J 8/00; C01B 17/00; C01B 21/00
[52] U.S. Cl. .................. 423/239; 423/244.1
[58] Field of Search .......... 423/230, 242 A, 243, 423/555, 244 A, 244 R, 239 A, 239 R

[56] References Cited

U.S. PATENT DOCUMENTS

| | | |
|---|---|---|
| 4,268,488 | 5/1981 | Ginger . |
| 4,756,891 | 7/1988 | Ohlmeyer et al. . |
| 4,810,476 | 3/1989 | Ohlmeyer . |
| 4,851,202 | 7/1989 | Fennemann .......... 423/239 |

FOREIGN PATENT DOCUMENTS

| | | |
|---|---|---|
| 0196481 | 10/1986 | European Pat. Off. . |
| 0172588 | 4/1988 | European Pat. Off. . |
| 0268353 | 5/1988 | European Pat. Off. . |
| 0318808 | 6/1989 | European Pat. Off. . |
| 0385958 | 9/1990 | European Pat. Off. . |
| 3701527 | 8/1988 | Fed. Rep. of Germany . |
| 3808586 | 9/1989 | Fed. Rep. of Germany . |
| 4014388 | 11/1990 | Fed. Rep. of Germany . |
| 8909183 | 10/1989 | PCT Int'l Appl. . |
| 214581 | 8/1967 | Sweden . |
| 223304 | 11/1968 | Sweden . |
| 7908674 | 8/1983 | Sweden . |
| 8700117 | 12/1988 | Sweden . |

Primary Examiner—Gregory A. Heller
Attorney, Agent, or Firm—Burns, Doane, Swecker & Mathis

[57] ABSTRACT

The present invention concerns a particulate agent for chemical and/or physical treatment of a fluid, such as a gas containing $NO_x$ and $SO_x$, contains at least two particle types of different activity, the particle weight and/or particle size of each type lying within separate ranges. The agent may also contain catalyst particles for reducing $NO_x$, and particles for absorbing $SO_x$.

The invention also concerns a method and a plant for treating a fluid with the inventive particulate agent.

14 Claims, 1 Drawing Sheet

PROCESS FOR THE REMOVAL OF NO$_x$ SO$_x$ UTILIZING A PARTICULATE AGENT

The present invention relates to a particulate agent for chemical and/or physical treatment of a fluid. The agent contains at least two particle types of different activity and different weight and/or size. The invention also concerns a method for treating a fluid, and a plant for carrying out the inventive method.

It is common that fluids, above all gases, undergo chemical or physical reactions in contact with solid particles which, for instance, may be catalytically active or capable of absorbing certain substances. In many cases, it is desirable that a fluid undergoes reactions requiring the presence of different particle types of different activity. Frequently, the particle activity changes in course of time, and the particles must then be replaced or regenerated. However, different types of particles cannot always be regenerated or otherwise after-treated together, for which reason the different reaction steps must be carried out in different reaction chambers, thus increasing the investment costs of the process plants.

Mostly, flue gases from the combustion of e.g. fossil fuels or refuse have contents of both NO$_x$ (NO and NO$_2$) and SO$_x$ (SO$_2$ and SO$_3$) that are unacceptable from the environmental point of view. To reduce the contents of these impurities, the gases can be treated with two different particle types of different activity.

SE, A 8700117-8 discloses a process for treating flue gases by catalytically reducing NO$_x$ with ammonia. Catalyst particles are supplied to the gas flow which is conducted through a filter in a reaction chamber where the particles are separated and form a catalytic coating. At times, the catalyst must be regenerated, and the particles are then expelled from the reaction chamber, regenerated by heating, and then recycled to the process. The process is very efficient but separate process steps are required for the separation of sulphur compounds.

SE, A 7908674-0 discloses a process for treating flue gases by particles that form a coating on a filter, absorbing SO$_x$. These particles must be removed when their activity decreases. Further, separate process steps are required for separating nitric oxides in the flue gases.

EP, A2, 318808 discloses a process for the removal of SO$_x$ from a gas by treatment with metal, oxygen-containing particles which may be regenerated.

SE patents 214581 and 223304 describe methods for the regeneration of SO$_2$-acceptors.

U.S. Pat. No. 4,268,488 discloses a process for reducing NO$_x$ in a gas by treating it with two different catalysts.

WO 89/09183 and DE, A1, 3701527 describe processes for removing NO$_x$ and SO$_x$ from gases by mixtures of active agents.

U.S. Pat. Nos. 4,756,891 and 4,810,476 disclose a process for treating a gas by catalytically active continuously circulating spheres which may be replaced by new or regenerated spheres of the same type with the same kind of activity but another size.

It has long been desired to be able to reduce plant and operation costs by using the same equipment to simultaneously carry out several kinds of processes, despite it being necessary at times to remove the active particles and treat the different particle types in different ways. According to the invention, this can be achieved by the particulate agent of claim 1. The invention also concerns a method for chemical and/or physical treatment of a fluid, as well as a plant for carrying out the inventive method, as stated in the appended claims.

BRIEF DESCRIPTION OF THE DRAWING

For a more complete understanding of the invention, the specification should be read in conjunction with the drawing, wherein.

Figure 1:
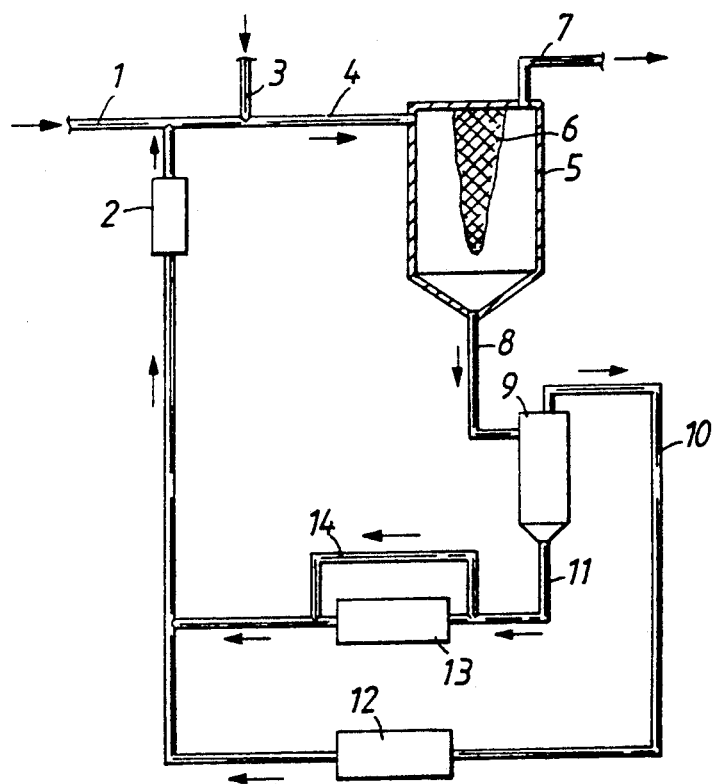
FIG. 1 is a schematic illustration of one embodiment of the fluid treatment process of the invention.

The particulate agent for chemical and/or physical treatment of a fluid contains at least two particle types of different activity. Each particle type lies within separate particle weight and/or particle size ranges, i.e. without overlapping each other, and the different particle types are thus easily separated, e.g. by a cyclone. In other words, the particulate agent contains at least two types of active particles which require separate after-treatment and each particle type lies within a specific and well-defined range of particle weight and/or size. Preferably, the mixture of particles is substantially static and the different types of particles are substantially uniformly distributed throughout the mixture. In a non-compressed state, the mixture of particles suitably has a porosity less than about 80%, preferably less than about 65%, most preferably less than about 60%, but preferably more than about 10%. The porosity refers to the free volume between the particles in relation to the total volume taken up by the mixture. The preferred bulk density of the particle mixture is from about 200 to about 800 g/l, preferably from about 400 to about 600 g/l.

The different particle types may have different kinds of catalytic activity, the ability to react chemically with one or more components of the fluid, or have a physical property, e.g. power of absorption, in relation to one or more components of the fluid. If a cyclone is to be used for separating the particles, the particle size is suitably less than 1 mm, preferably less than 0.2 mm. Generally, the smaller the particles, the greater their activity. However, if the particles are too small, it may be difficult to separate them from the fluid. If a filter is used for the separation, the pressure drop increases as the particle size decreases. The particles should not be smaller than 0.1 μm, preferably not smaller than 1 μm. A preferred range is from 1 to 200 μm. The difference in particle weight or particle size between the different particle types should be sufficient to enable separation thereof. Suitable numerical values depend on the chemical, physical and mechanical properties of the particles, and are easily determined experimentally by anyone skilled in the art.

In a preferred embodiment, the agent is in the form of an active coating of substantially uniformly distributed particles as described above on the surface of a filter, preferably a bag filter. The coating is preferably from about 1 to about 20 mm, most preferably from about 3 to about 10 mm thick.

When the particles are used in a method for chemical and/or physical treatment of fluid, i.e. a gas, liquid or mixture thereof, the treatment takes place in a reaction chamber where the particles are contacted with the fluid. During or after this treatment, the particles are separated from the fluid and removed from the chamber. The separation can be carried out in known manner, e.g. by filtering or in a cyclone.

In a preferred embodiment, the fluid is conducted through a filter arranged in the reaction chamber and separating the particles which form an active coating on the filter. Frequently, it is suitable to use a bag filter since this gives a large contact surface and a comparatively low pressure drop. When the particle activity has fallen to an unacceptable level, the particles are removed from the filter and the reaction chamber, whereupon new or regenerated particles are supplied to the fluid stream. The particles can be removed by countercurrent blowing of a preferably inert fluid. Also mechanical methods, such as shaking or scraping, may be used, optionally together with air-blowing. It is preferred that the particles are discontinuously removed and supplied, which is more practical, but the invention also embraces continuous removal and supplying during the course of the process.

The particles removed from the reaction chamber are separated according to weight or size, such that the different particle types are separated from one another and can be subjected to different after-treatments. There are many prior art methods for separating particles of different weight or size. If the fluid is a gas, as is usually the case, it is preferred to conduct the fluid through one or more cyclones, owing to the efficiency and simple and robust construction of cyclones. However, it is perfectly conceivable to use screening, sedimentation or centrifuging as an alternative, or as a complement. The latter techniques are applicable when the fluid is a liquid.

The after-treatments may be a thermal treatment at different temperature levels, or a treatment with different substances. At times, useful products can be recovered from the particles which have been contacted with the fluid. Advantageously, the after-treatment of the particles implies a regeneration enabling a recycling to the process. Generally, the different particle types are regenerated in different ways and must therefore be treated separately. Sometimes, it is not possible to regenerate all the particle types, and one or more particle types must therefore be removed from the cycle once their activity has decreased to an unacceptable level, whereupon new particles need be added. As the process proceeds, there is, in most cases, a loss of particles which also must be compensated for. Sometimes, the used particles are a useful product in themselves. If the removal is discontinuous, it should be carried out when the activity of at least one of the particle types has fallen to an unacceptable level. If the particles are regenerated and recycled, one or more of the other particle types can be recycled directly without regeneration, at least in some of the instances of recycling. For example, one particle type can be regenerated at each recycling, another type can be regenerated at every fifth recycling, and a third type can be regenerated at every fiftieth recycling. Thus, the different particle types are regenerated only when necessary and are otherwise recycled directly after separation.

If the regeneration is time-consuming, a buffer stock of particles is suitably provided between the regenerating equipment and the apparatus for dosing the particles. Buffer stocks may also be provided elsewhere to compensate for varying process times in different steps.

The manner in which the particles are best transported upon recycling depends above all on their mechanical and physical properties. Generally, it is suitable to use pneumatic transport or mechanical devices, such as screw conveyors, or to simply let the particles drop by gravity.

Despite the discontinuous removal and supply of the particles, it is possible to have a continuous process if the plant is divided into several sections with separate filters where the particles are exchanged on different occasions.

Even if the inventive method has been described as a continuous process, the scope of the invention also embraces batchwise processes in which the particles must be removed and separated from one another.

The inventive method is very useful in processes for removing pollutants from gases, such as flue gases from combustion.

A preferred plant for treating a fluid with the inventive particulate agent comprises a reaction chamber with a fluid inlet and a fluid outlet. A particle separator is arranged in or after the reaction chamber in such manner that the fluid flows therethrough. In a preferred embodiment, a filter is provided in the reaction chamber. Furthermore, the plant comprises means for removing particles from the particle separator. In the embodiment with a filter in the reaction chamber, these means usually serve to create a counter-current flow through the filter of a preferably inert fluid which removes the particles and further conducts them through a conduit to a device for separating particles of different weight or size. Sometimes, it is suitable to also have means for shaking or mechanically cleaning the filter. Further, several filters may be connected in parallel in the reaction chamber, thereby to achieve a continuous process despite the discontinuous removal of the particles.

Suitably, the separation device consists of one or more cyclones, but also other equipment may be used. If one or more of the particle types are to be recycled, the plant comprises devices for separate transport so that these can be recycled to the process. These devices may comprise means for pneumatic transport, which preferably are combined with mechanical devices, such as screw conveyors. Also sections where the particles drop by gravity can be included. If any particle type must be regenerated, there is at least one regenerator for each particle type to be regenerated separately. At least one of the transport devices comprises means for conducting, when necessary, the particles through the regenerator before they are recycled to the process, optionally via a buffer stock.

The invention will be further illustrated below in connection with a specific problem. The flue gases formed on combustion of especially fossil fuels or refuse often contain impurities in the form of nitric oxides and sulphur oxides. Up to now, it has been impossible to considerably reduce, in an economic manner, the contents of both $NO_x$ and $SO_x$ in a gas in one and the same step.

The particulate agent for purifying gases contains particles within a certain particle weight range and/or particle size range for treating $NO_x$ in gas phase, preferably catalyst particles for reducing $NO_x$, e.g. with ammonia. Any particulate catalyst for reducing $NO_x$ will do. The preferred catalyst particles comprise small grains of an inorganic oxide, preferably $SiO_2$, the grains being coated with a catalytic layer containing $TiO_2$ and $V_2O_5$ and obtained by separate or simultaneous coating. Also particles of zeolite or active carbon are suitable carriers. Preferably the catalyst contain from 5 to 35% $V_2O_5$ by weight of the total weight and a preferred weight ratio $TiO_2:V_2O_5$ is from 0.15 to 0.25. When the particles are contacted with gas containing sulphur compounds, a thin layer of $(NH_4)_2SO_4$ is formed on the particles, but may, like most other coatings formed, be removed by heating. Suitably, the particles have a size of 1-200 μm, preferably 10-100 μm. This catalyst shows a high activity already at such a low temperature as 150° C. Low temperatures promote the absorption of $SO_x$ while at the same time involving economic savings. The above type of catalyst particles and the production thereof are described in more detail in EP, A2, 0385958.

In addition to particles within a certain particle weight range and/or particle size range for treating $NO_x$, the agent contains particles within another particle weight range and/or particle size range for treating $SO_x$ in gas phase, preferably by absorbing the compounds themselves or their reaction products. All particles capable of absorbing or otherwise removing $SO_x$ from a gas can be used. Suitable absorption agents include oxides, hydroxides or carbonates of alkali metals or alkaline earth metals, or oxides of manganese, rhenium, sodium, potassium, zinc, copper or silver. These may be separate or mixed with one another. It is preferred, although not necessary, to have the active substances on a carrier, such as $SiO_2$. A preferred absorption agent comprises a carrier of $SiO_2$ on which $MnO_2$ and $CuO$ are coprecipitated. It is possible to replace $MnO_2$ by $Re_2O_7$, or another rhenium oxide, or to substitute $AgO$ for $CuO$. Contact with $SO_x$ generally results in the formation of solid sulphates which can be removed from the particles by some suitable treatment. A suitable particle size is 1-200 μm, preferably 10-100 μm.

Further, the active agent may contain particles active for removing other pollutants from a gas, such as heavy metals or organic substances.

The proportions between the different particle types depends on the ratio of pollutants such as $NO_x$ to $SO_x$ in the gas to be treated. In most cases, it is suitable that the agent contains 10-90% by weight of one particle type. The suitable difference in weight or size of the particles is dependent on the mechanical and physical properties of the particles used. Frequently, similar carrier materials are used, which means that the densities of the particles are in the same order. In that case, it has been found suitable that one particle type has a size of 5-45 μm, preferably 10-30 μm, while the other particle type has a size of 55-100 μm, preferably 65-80 μm.

A method and a plant for treating a gas containing $NO_x$ and $SO_x$ in such manner that the contents of these substances are lower in the outflowing than in the inflowing gas, will now be described with reference to FIG. 1 which schematically illustrates such a process. Gas containing $NO_x$ and $SO_x$ and originating from e.g. a combustion plant flows through a conduit 1. Suitably, any solid particles or dust present in the gas have been separated earlier. A particle mixture for catalytically reducing $NO_x$ and absorbing $SO_x$ as described above is added, preferably discontinuously, by means of a dosing apparatus 2, optionally from a storage bunker or a buffer stock. A reducing agent for reducing $NO_x$, preferably ammonia, is supplied through another conduit 3. The suitable influx of the reducing agent depends on the amount of $NO_x$ present. The two conduits 1, 3 converge into a common inlet 4 to a reaction chamber 5.

The gas is conducted through a filter 6, preferably a bag filter, arranged in the chamber. The particles are separated by the filter on which they form an active coating where the reduction of $NO_x$ and the absorption of $SO_x$ take place. The amount of particles is chosen so as to give the desired degree of purification of the gas. The treated gas is removed via an outlet 7. Suitably, the temperature in the reaction chamber is 170-250° C., preferably 175-200° C. Lower temperatures promote the absorption of $SO_x$ and, in addition, involve economic savings. However, if the temperature becomes too low, the yield of the $NO_x$ reduction decreases. In fact, this reduction can be carried out at temperatures of up to 400° C., although some catalysts may cause a formation of $N_2O$.

When the plant is in operation, the sulphur oxides form a solid coating of sulphates on the particles for absorbing $SO_x$. Thus, the activity of these particles is gradually reduced, and the particles must be exchanged after a certain period of time which depends on the operating parameters, especially the amount of $SO_x$ in relation to the amount of particles in the reaction chamber. The exchanges may follow a predetermined schedule based on experience, or be carried out when analyses of the outflowing gas show that the degree of purification is insufficient. In practice, it has been found suitable to let 20-120 min. pass between the particle exchanges. The filter is cleaned of particles, suitably by means of a backward flow of preferably inert gas, optionally in combination with shaking or mechanical cleaning of the filter. The particles are transported by pneumatic means or by gravity through a conduit 8 to a cyclone 9 adapted to separate the particles for $NO_x$ reduction from the particles for $SO_x$ absorption in that these lie within separate particle weight or particle size ranges. The particles for $SO_x$ absorption are conducted through a conduit 10 to a regenerator 12 where they are treated with a reducing agent, such as hydrosulphuric acid or methane, suitably at 300-700° C., such that the solid sulphates are converted to hydrosulphuric acid or sulphur. It is also possible to recover sulphur oxides by treatment with e.g. air, suitably at 700-800° C.

The catalyst particles for $NO_x$ reduction, which need not be regenerated quite that often, are transported through a conduit 11 which can be connected to either conduct the particles through a by-pass conduit 14 or through a regenerator 13. In the regenerator, the particles are heated, suitably to 250-500° C., such that any coatings of ammonium sulphate or other impurities are decomposed and evaporate. In practice, it is usually enough to regenerate the particles once per one to three weeks, and the by-pass conduit is therefore used on most recycling occasions.

After one or both particle types have been regenerated, they are mixed and recycled to the process through the dosing apparatus 2, optionally via one or more buffer stocks.

The particles can be transported in the recycling system in many ways, e.g. by pneumatic means, gravity, screw conveyors or other mechanical devices. To reduce shut-down times to a minimum, buffer stocks for the particles used in the system are suitably provided at one or more points. In the process described above, gases containing both $NO_x$ and $SO_x$ can be purified in one and the same step, which is highly advantageous in terms of both investment costs and plant operation.

The following Example illustrates the purification of a gas containing $NO_x$ and $SO_x$. All contents are given in parts by weight, unless otherwise indicated. It goes without saying that the invention is not restricted to the purification of gases but is applicable to all treatments of a fluid involving at least two types of active particles which are to be after-treated or regenerated separately.

EXAMPLE

Gas containing 610 ppm $NO_x$, 375 ppm $SO_x$ and 7% $O_2$, the balance being $N_2$, was conducted at a flow rate of 2 l/min. to a reactor with a diameter of 78 mm. The reactor contained 60 ml of particles, half of which consisted of $SiO_2$ coated by two-step precipitation with $V_2O_5$ and $TiO_2$. These particles had a diameter of about 70 µm. The other half consisted of $SiO_2$ coated with coprecipitated $MnO_2$ and CuO, and these particles had a diameter of about 15 µm. The temperature in the reactor was 180° C., and the degree of purification attained was 75% for $SO_x$ and 88% for $NO_x$.

We claim:

1. A method for the removal of $NO_x$ and $SO_x$ in a gas, comprising the steps of:
   (a) providing a reaction chamber containing a particulate agent, the particulate agent comprising a mixture of a fist particle type for removing $NO_x$ and a second particle type for removing $SO_x$, the first and second particle types being separable by means of particle weight, particle size or both;
   (b) contacting the gas with the particulate agent thereby reducing the levels of $NO_x$ and $SO_x$ in the gas;
   (c) separating the gas from the particulate agent in the reaction chamber;
   (d) removing the particulate agent from the reaction chamber; and
   (e) separating particles in the particulate agent according to particle type;
   wherein the first particle type includes a catalytically effective amount of $V_2O_5$ and wherein the second particle type includes at least one compound selected from the group consisting of alkali metal oxides, hydroxides and carbonates, alkaline earth metal oxides, hydroxides and carbonates, and oxides of manganese, rhenium, sodium, potassium, zinc, copper and silver.

2. A method as claimed in claim 1, wherein the first particle type further includes a catalytically effective amount of $TiO_2$.

3. A method as claimed in claim 1, wherein the reaction chamber includes a filter, and wherein the method includes the steps of forming a mixture of particulate agent and gas to be treated, conveying the mixture to the reaction chamber, forming an active coating of the particulate agent on the filter, treating the gas by contacting the fluid with the active coating, and discontinuously removing the particulate agent forming the active coating.

4. A method as claimed in claim 1, including the step of recycling to the reaction chamber at least a portion of the particle separated in step (e).

5. A method as claimed in claim 4, including the step of regenerating the particles prior to recycling.

6. A method as claimed in claim 3, including the step of recycling to the reaction chamber at least a portion of the particles separated in step (e).

7. A method for removal of $NO_x$ and $SO_x$ in a gas, comprising the steps of:
   (a) providing a reaction chamber containing a particulate agent, the particulate agent comprising a mixture of a first particle type for catalytically reacting $NO_x$ and a second particle type for absorptively removing $SO_x$, wherein the particle size of said first and second particle types is at least 0.1 µm and less than 1 mm and wherein the first and second particle types have a difference in size sufficient to enable separation thereof;
   (b) contacting the gas with the particulate agent thereby reducing the levels of $NO_x$ and $SO_x$ in the gas;
   (c) separating the gas from the particulate agent in the reaction chamber;
   (d) removing the particulate agent from the reaction chamber; and
   (e) separating particles in the particulate agent according to the particle type.

8. A method as claimed in claim 7, wherein the particle size of said first and second particle types is at least 1 µm and less than 200 µm.

9. A method as claimed in claim 7, wherein one of said first and second particle types has a particle size of 5-15 µm and the other of said first and second particle types has a particle size of 55-100 µm.

10. A method as claimed in claim 7, wherein the reaction chamber includes a filter, and wherein the method includes the steps of forming a mixture of particulate agent and gas to be treated, conveying the mixture to the reaction chamber, forming an active coating of the particulate agent on the filter treating the gas by contacting the gas with the active coating, and discontinuously removing the particulate agent forming the active coating.

11. A method as claimed in claim 7, including the step of recycling to the reaction chamber at least a portion of the particles separated in step (e).

12. A method as claimed in claim 11, including the step of regenerating the particles prior to recycling.

13. A method as claimed in claim 10, including the step of recycling to the reaction chamber at least a portion of the particles separated in step (e).

14. A method as claimed in claim 13, including the step of regenerating the particles prior to recycling.

* * * * *